United States Patent
Martin et al.

(10) Patent No.: US 11,135,931 B2
(45) Date of Patent: Oct. 5, 2021

(54) SYSTEM FOR CHARGING A BATTERY ELECTRIC VEHICLE OR A PLUGIN HYBRID VEHICLE USING A MOBILE FUEL CELL

(71) Applicant: GM Global Technology Operations LLC, Detroit, MI (US)

(72) Inventors: Alan B. Martin, Washington, MI (US); Matthew C. Kirklin, Lake Orion, MI (US); Margarita M. Mann, Royal Oak, MI (US); William H. Pettit, Rochester, NY (US); Charles E. Freese, V, Ira Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 246 days.

(21) Appl. No.: 16/424,059

(22) Filed: May 28, 2019

(65) Prior Publication Data
US 2020/0376975 A1 Dec. 3, 2020

(51) Int. Cl.
*H02J 7/00* (2006.01)
*B60L 53/60* (2019.01)
*H01M 10/44* (2006.01)
*H01M 8/04828* (2016.01)
*B60L 53/35* (2019.01)
*B60L 53/54* (2019.01)
*B60L 53/10* (2019.01)

(52) U.S. Cl.
CPC .............. *B60L 53/60* (2019.02); *B60L 53/10* (2019.02); *B60L 53/35* (2019.02); *B60L 53/54* (2019.02); *H01M 8/0494* (2013.01); *H01M 10/441* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 10,000,133 | B2 * | 6/2018 | Weidner | B60L 53/122 |
| 10,873,099 | B1 * | 12/2020 | Gurunathan | B60L 53/60 |
| 2003/0091503 | A1 * | 5/2003 | Rosenfeld | B60L 53/51 |
| | | | | 423/657 |
| 2003/0134167 | A1 * | 7/2003 | Hirakata | H01M 8/04228 |
| | | | | 429/432 |
| 2003/0155160 | A1 * | 8/2003 | Nomura | B60L 58/34 |
| | | | | 180/65.1 |
| 2004/0205032 | A1 * | 10/2004 | Routtenberg | G06Q 30/0283 |
| | | | | 705/400 |
| 2009/0246596 | A1 * | 10/2009 | Sridhar | B60L 11/1811 |
| | | | | 429/513 |
| 2010/0003545 | A1 * | 1/2010 | Horne | H01M 8/20 |
| | | | | 429/471 |
| 2011/0016063 | A1 * | 1/2011 | Pollack | B60L 53/18 |
| | | | | 705/412 |
| 2011/0223450 | A1 * | 9/2011 | Horne | B60L 50/64 |
| | | | | 429/72 |
| 2012/0013300 | A1 * | 1/2012 | Prosser | B60L 11/1844 |
| | | | | 320/109 |
| 2015/0054460 | A1 * | 2/2015 | Epstein | B60L 53/64 |
| | | | | 320/109 |
| 2017/0155253 | A1 * | 6/2017 | Veda | G06F 1/26 |

* cited by examiner

*Primary Examiner* — Arun C Williams
(74) *Attorney, Agent, or Firm* — Quinn IP Law

(57) ABSTRACT

A mobile fuel cell system includes a fuel cell generator generating a stack output signal. Multiple boost converter circuits converting the stack output signal into multiple recharge signals while in a first mode. A boost converter circuit converting the stack output signal into a local signal while in a second mode. Multiple charging handles connectable to multiple electric vehicles. A switch circuit presenting the recharge signals to the charging handles, remove the recharge signals from the charging handles and present the local signal while in the second mode. An auxiliary load may be connected to the fuel cell generator and the switch circuit. A rechargeable energy storage circuit powers the auxiliary load while in the first mode and stores energy received in the local signal while in the second mode. The auxiliary load is powered with the local signal while in the second mode.

20 Claims, 12 Drawing Sheets

SYSTEM FOR CHARGING A BATTERY ELECTRIC VEHICLE OR A PLUGIN HYBRID VEHICLE USING A MOBILE FUEL CELL

INTRODUCTION

Owners of battery electric vehicles who want to charge their battery electric vehicles during long trips desire fast charging. Presently, fast charge stations exist but involve local investment for infrastructure to install. If a location is chosen poorly, the investment may be wasted. Petroleum generator based charging stations generate emissions and therefore may be unsatisfactory choices for the owners of the battery electric vehicles. Installing many storage batteries at charging stations relocates the charging problem as large charging interfaces are necessary to recharge the storage batteries when depleted. Typical fuel-cell based charging stations buffer fuel-cell output power with storage batteries prior to sending the output power to the battery electric vehicles. However, the typical fuel-cell based charging stations use some of the fuel-cell output power to run auxiliary equipment in real time and thus divert a portion of the fuel-cell output power away from charging the battery electric vehicles.

SUMMARY

A mobile fuel cell system is provided herein. The mobile fuel cell system comprises a fuel cell generator disposed on a mobile platform. The fuel cell generator has at least one fuel cell stack operable to generate electrical power in a stack output signal. A plurality of boost converter circuits are connected to the fuel cell generator. The plurality of boost converter circuits are: operable to convert the stack output signal into a plurality of recharge signals while in a first mode; one of the plurality of boost converter circuits is operable to convert the stack output signal into a local signal while in a second mode; and the stack output signal has a different voltage than the plurality of recharge signals. A plurality of charging handles are connectable to a plurality of electric vehicles. The plurality of charging handles are operable to transfer the plurality of recharge signals to the plurality of electric vehicles.

The mobile fuel cell system includes a switch circuit connected to the plurality of boost converter circuits and the plurality of charging handles. The switch circuit is operable to: present corresponding ones of the plurality of recharge signals to corresponding ones of the plurality of charging handles while corresponding ones of the electric vehicles are being charged; remove the corresponding ones of the plurality of recharge signals from the corresponding ones of the plurality of charging handles while the corresponding ones of the plurality of electric vehicles are not being charged; and present the local signal while in the second mode. An auxiliary load is connected to the fuel cell generator and the switch circuit.

The mobile fuel cell system includes a rechargeable energy storage circuit connected to the switch circuit and the auxiliary load. The rechargeable energy storage circuit is operable to power the auxiliary load while in the first mode; and store energy received in the local signal while in the second mode. The auxiliary load is powered with the local signal while in the second mode.

In one or more embodiments, the fuel cell generator generally comprises a plurality of fuel cell stacks.

In one or more embodiments, the stack output signal comprises a plurality of stack output signals generated by the plurality of fuel cell stacks; and each of the plurality of boost converter circuits receives a corresponding one of the plurality of stack output signals.

In one or more embodiments, the switch circuit includes: a plurality of first switches directly connected to the plurality of boost converter circuits; a high-voltage bus directly connected to the plurality of first switches; and a plurality of second switches directly connected between the high-voltage bus and the plurality of charging handles.

In one or more embodiments, the mobile fuel cell system further comprises a controller connected to the fuel cell generator and operable to adjust a setpoint of the fuel cell generator by deferring recharging of the rechargeable energy storage circuit while charging at least one of the plurality of electric vehicles.

In one or more embodiments, the electrical power in the stack output signal is completely transferred to the plurality of charging handles while in the first mode.

In one or more embodiments, the mobile fuel cell system further comprises a portable inverter connected to the switch circuit, where: the portable inverter is operable to generate a portable signal; and the switch circuit is operable to present the portable signal to one or more of the plurality of charging handles to charge one or more support batteries in one or more of the plurality of electric vehicles.

In one or more embodiments, the switch circuit is configured to combine two or more of the plurality of recharge signals to charge one of the plurality of electric vehicles.

In one or more embodiments, the switch circuit is operable to connect each one of the plurality of boost converter circuits with each one of the plurality of charging handles.

A method for charging a plurality of electric vehicles with a mobile fuel cell system is provided herein. The method comprises generating electrical power in a stack output signal with at least one fuel cell stack in a fuel cell generator disposed on a mobile platform; and converting the stack output signal into a plurality of recharge signals while in a first mode, where the stack output signal has a different voltage than the plurality of recharge signals. The method includes converting the stack output signal into a local signal while in a second mode; presenting corresponding ones of the plurality of recharge signals to corresponding ones of a plurality of charging handles while corresponding ones of the plurality of electric vehicles are being charged; and removing the corresponding ones of the plurality of recharge signals from the corresponding ones of the plurality of charging handles while the corresponding ones of the plurality of electric vehicles are not being charged.

The method includes transferring the corresponding ones of the plurality of recharge signals from the corresponding ones of the plurality of charging handles to the corresponding ones of the plurality of electric vehicles being charged; and powering an auxiliary load from a rechargeable energy storage circuit while in the first mode. The method includes storing energy received in the local signal in the rechargeable energy storage circuit while in the second mode; and powering the auxiliary load with the local signal while in the second mode.

A mobile fuel cell system is provided herein. The mobile fuel cell system comprises a fuel cell stack disposed on a mobile platform, wherein the fuel cell stack is operable to generate electrical power in a stack output signal. A first boost converter circuit is connected to the fuel cell stack. The first boost converter circuit is operable to: convert the stack output signal into a first recharge signal while in a first mode; and convert the stack output signal into a local signal while in a second mode, wherein the stack output signal has a different voltage than the first recharge signal. A first charging handle is connectable to a first electric vehicle, wherein the first change handle is operable to transfer the first recharge signal to the first electric vehicle. A switch circuit is connected between the first boost converter circuit and the first charging handle. The switch circuit is operable to present the first recharge signal to the first charging handle while the first electric vehicle is being charged; remove the first recharge signal from the first charging handle while the first electric vehicle is not being charged; and present the local signal while in the second mode.

The mobile fuel cell system includes an auxiliary load connected to the fuel cell stack and the switch circuit. A rechargeable energy storage circuit is connected to the auxiliary load and the switch circuit. The rechargeable energy storage circuit is operable to power the auxiliary load while in the first mode; and store energy received in the local signal while in the second mode. The auxiliary load is powered with the local signal while in the second mode.

In one or more embodiments, the mobile fuel cell system may further comprise a second boost converter circuit connected between the fuel cell stack and the switch circuit, wherein: the second boost converter circuit is operable to convert the stack output signal into a second recharge signal while in the first mode; and the stack output signal has a different voltage than the second recharge signal. A second charging handle is connectable to a second electric vehicle, wherein the second charging handle is operable to transfer the second recharge signal to the second electric vehicle. The switch circuit is connected between the second boost converter circuit and the second charging handle. The switch circuit is operable to present the second recharge signal to the second charging handle while the second electric vehicle is being charged; and remove the second recharge signal from the second charging handle while the second electric vehicle is not being charged.

In one or more embodiments, the mobile fuel cell system further comprises a third boost converter circuit connected between the fuel cell stack and the switch circuit, wherein: the third boost converter circuit is operable to convert the stack output signal into a third recharge signal while in the first mode; and the stack output signal has a different voltage than the third recharge signal. A third charging handle is connectable to a third electric vehicle, wherein the third charging handle is operable to transfer the third recharge signal to the third electric vehicle. The switch circuit is connected between the third boost converter circuit and the third charging handle, wherein the switch circuit is operable to: present the third recharge signal to the second charging handle while the third electric vehicle is being charged; and remove the third recharge signal from the third charging handle while the third electric vehicle is not being charged.

In one or more embodiments, the local signal is generated by one of the second boost converter circuit or the third boost converter circuit while in the first mode.

In one or more embodiments, the fuel cell stack is operable in a voltage suppression mode; and the second boost converter circuit is operable to continue charging the second electric vehicle during the voltage suppression mode.

In one or more embodiments, the fuel cell stack is operable in a voltage recovery mode; and the second boost converter circuit is operable to continue charging the second electric vehicle during the voltage recovery mode.

In one or more embodiments, the local signal allows the fuel cell stack to continue to generate the stack output signal and the second boost converter circuit to charge the second electric vehicle while the rechargeable energy storage circuit is depleted.

In one or more embodiments, the electrical power in the stack output signal is completely transferred to the first electric vehicle while in the first mode.

In one or more embodiments, charging of the rechargeable energy storage circuit while in the second mode delays a shutdown of the fuel cell stack while the first charging handle is not being used.

In one or more embodiments, the mobile fuel cell system further comprises one or more auxiliary loads, wherein the auxiliary loads are powered by the rechargeable energy storage circuit while in the first mode and by the local signal while in the second mode.

The above features and advantages and other features and advantages of the present disclosure are readily apparent from the following detailed description of the best modes for carrying out the disclosure when taken in connection with the accompanying drawings.

DETAILED DESCRIPTION

Various embodiments of the design provide a mobile charging architecture that may produce a maximum output power and peak operational efficiency to charge electric vehicles (e.g., battery electric vehicles and/or plugin hybrid vehicles). The mobile charging architecture may be used to create a fleet of multiple mobile charging stations.

The mobile charging architecture may help reduce costs for electric vehicle (EV) charging infrastructure deployment and may increase efficiencies in a mobile fuel-cell based charging systems. The mobile charge stations generally allow "scouting" of potential investment sites for permanent charger locations. Fuel-cell power generators within the mobile charging stations will produce less local emissions than petroleum-based generators. The mobile charging stations may provide a higher energy density and station refill time than existing battery-based solutions.

The mobile charging architecture may decouple a stack output power (e.g., a saleable product) from the auxiliary loads (e.g., overhead) used in support of generating the stack output power. The decoupling may be accomplished with one of several ways: via a switch circuit (or switchgear), via multiple boost converter circuits or a combination of the two ways. A high-voltage switching system in each mobile charging station may be configured to directly connect a fuel cell generator and one or more current-regulated boost converter circuits to one or more electric vehicles for charging. By removing the storage batteries commonly incorporated between the fuel-cell stack and the electric vehicles, consumption of the hydrogen fuel may be reduced due to the elimination of unnecessary power conversion steps.

Figure 1:
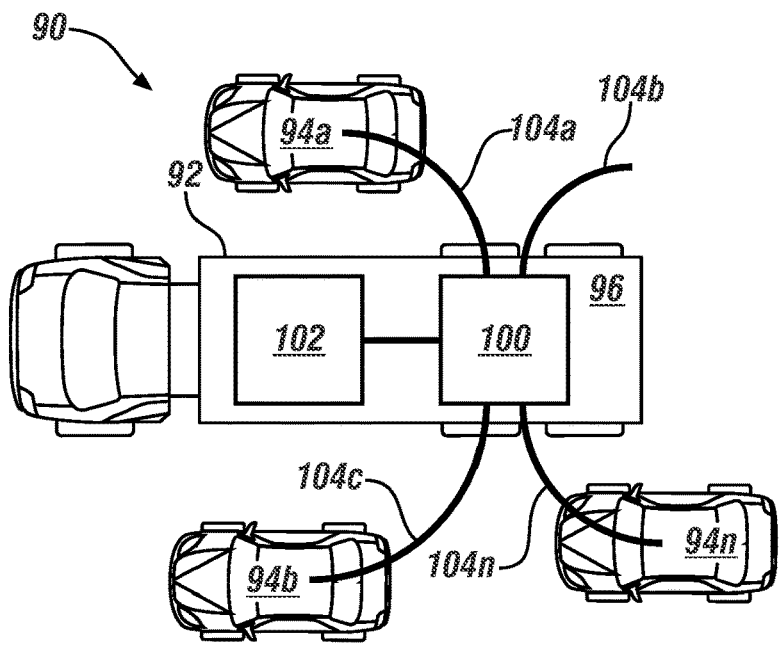
FIG. 1 is a schematic plan diagram illustrating a context of a system.

Referring to FIG. 1, a schematic plan diagram illustrating a context of a system 90 is shown. The system 90 may implement a mobile recharging system. The system 90 generally comprises a mobile fuel cell system 92 and multiple electric vehicles 94a-94n. The mobile fuel cell system 92 may include a mobile chassis 96, a generator 100, a fuel supply 102 and multiple cables 104a-104n. The generator 100 and the fuel supply 102 may be mounted in (or on) the mobile chassis 96. The cables 104a-104n may be connected to the generator 100.

The mobile fuel cell system 92 may implement a mobile DC fast recharging station (or Level 3 recharging station). The mobile fuel cell system 92 may be moveable to locations of interest to establish an electric vehicle recharging location. In various embodiments, one or more mobile fuel cell systems 92 may be moved to a common location to accommodate a large anticipated number of the electric vehicles 94a-94n. If the demand for recharging at the common location exceeds the capacity of the available mobile fuel cell systems 92, more mobile fuel cell systems 92 may be brought to the location. If the demand for recharging is less than anticipated, one or more of the mobile fuel cell systems 92 may be relocated to other locations.

Each electric vehicle 94a-94n may implement a battery electric vehicle or a plugin hybrid vehicle. The electric vehicles 94a-94n may include internal high-voltage batteries that drive electric motors to propel the vehicles. In various embodiments, the electric vehicles 94a-94n may include internal low-voltage batteries. The low-voltage batteries may be used to power vehicle equipment such as radios, fans, lights, instrument panels and the like. In various embodiments, the electric vehicles 94a-94n may include, but are not limited to, passenger vehicles, trucks, autonomous vehicles, electric bicycles and the like.

The mobile chassis 96 may implement a towable chassis or a self-propelled chassis (or vehicle). The mobile chassis 96 is generally operational to house the generator 100, the fuel supply 102 and the cables 104a-104n.

The generator 100 may implement a fuel-cell generator. The generator 100 is generally operable to convert fuel into electrical power that can be used to change the electric vehicles 94a-94n. In various embodiments, the generator 100 may implement one or more fuel cell stacks. Each fuel cell stack may operate independently of the other fuel cell stacks. The independence may allow some fuel cell stacks to be kept in an off state while the recharging demand is low and subsequently brought into an on state to accommodate increasing numbers of electric vehicles to charge.

The fuel supply 102 may implement a hydrogen fuel supply. The fuel supply 102 is generally operational to provide fuel (e.g., the hydrogen) to the generator 100. In other embodiments, other types of fuels such as natural gas may be implemented to meet the design criteria of a particular application.

The cables 104a-104n may implement recharging cables (or harnesses). The cables 104a-104n may be operational to carry high-voltage electrical power from the generator 100 to the electric vehicles 94a-94n. The high-voltage electrical power may be used to rapidly charge high-voltage batteries within the electric vehicles 94a-94n. In various embodiments, the high-voltage electrical power may range from approximately 300 volts direct current (Vdc) to approximately 1000 Vdc. Other high-voltage ranges may be implemented to meet the design criteria of a particular application. In some embodiments, the cables 104a-104n may also convey low-voltage electrical power from the generator 100 to the electric vehicles 94a-94n. The low-voltage electrical power may be used to charge the low-voltage batteries inside the electric vehicles 94a-94n. In some situations, the low-voltage electrical power may be used to charge low-voltage batteries in other types of vehicles, such as internal combustion engine vehicles and/or hybrid vehicles. The high-voltage electrical power and/or the low-voltage electrical power may be used to power other devices to meet the design criteria of a particular application. For example, electrical power available in the cables 104a-104n may be used to light tents at an outdoor festival.

Figure 2:
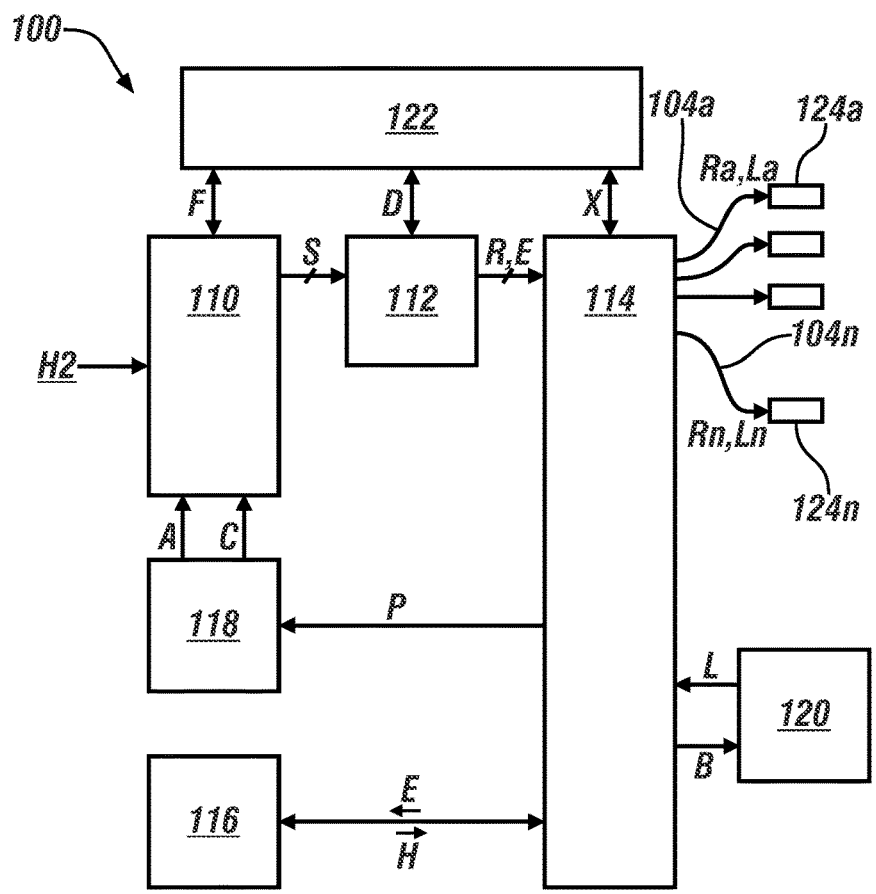
FIG. 2 is a schematic diagram of a generator in accordance with an exemplary embodiment.

Referring to FIG. 2, a schematic diagram of an example implementation of the generator 100 is shown in accordance with an exemplary embodiment. The generator 100 generally comprises a fuel cell generator 110, a DC boost converter circuit 112, switch circuit 114, a rechargeable energy storage system 116, a fuel cell plant circuit 118, a portable inverter 120 and a controller 122. Each cable 104a-104n may be connected at one end to the generator 100. Each cable 104a-104n may be connected at the other end to a respective charging handle 124a-124n.

Fuel (e.g., H2) from the fuel supply 102 (FIG. 1) may be received by the fuel cell generator 110. A stack output signal (e.g., S) may be generated by the fuel cell generator 110 and transferred to the DC boost converter circuit 112. The stack output signal S may be a direct current (DC) electrical signal that conveys electrical power generated by the fuel cell generator 110. A recharge signal (e.g., R) may be generated by the DC boost converter circuit 112 and presented to the switch circuit 114. The recharge signal R may be another DC electrical signal at a controlled power or current that carries the electrical power generated by the fuel cell generator 110. The switch circuit 114 may generate multiple branches of the recharge signal (e.g., Ra-Rn). The multiple recharge signals Ra-Rn may transfer the branches of the DC electrical power through the cables 104a-104n to the charging handles 124a-124n.

The DC boost converter circuit 112 may also generate a local signal (e.g., E). The local signal E may be another high-voltage signal that carries a portion of the electrical power generated by the fuel cell generator 110 for local (or internal) use within the generator 100. In various embodiments, the local signal E may have a lower operating voltage range than the recharging signal R.

The switch circuit 114 may generate a plant signal (e.g., P). The plant signal P may be an electrical signal that delivers power consumed by the fuel cell plant circuit 118. In some modes (e.g., a first mode), the plant signal P may be derived from the rechargeable energy storage system 116. In other modes (e.g., a second mode), the plant signal P may be derived from the DC boost converter circuit 112 via the local signal E. An auxiliary signal (e.g., A) may be generated by the fuel cell plant circuit 118 and presented to the fuel cell generator 110. The auxiliary signal A may include a variety of signals (e.g., electrical, pneumatic and/or thermal) created by the fuel cell plant circuit 118 for use by the fuel cell generator 110. A compressor signal (e.g., C) may be generated by the fuel cell plant circuit 118 and presented to the fuel cell generator 110. The compressor signal C may be an electrical signal used to power one or more compressors within the fuel cell generator 110.

In some modes (e.g., the first mode), a high-voltage signal (e.g., H) may be generated by the rechargeable energy storage system 116 and transferred to the switch circuit 114. In other modes (e.g., the second mode), the rechargeable energy storage system 116 may receive the local signal E from the switch circuit 114. The high-voltage signal H may be a DC high-voltage electrical signal created by energy stored in the rechargeable energy storage system 116.

A portable signal (e.g., B) may be generated by the switch circuit 114 and conveyed to the portable inverter 120. In some modes (e.g., the first mode), the portable signal B may be the high-voltage signal H generated by the rechargeable energy storage system 116. In other modes (e.g., the second mode), the portable signal B may be the local signal E as generated by the DC boost converter circuit 112. The portable inverter 120 may generate a low-voltage signal (e.g., L). In various embodiments, the low-voltage signal L may be a DC electrical signal in a voltage range used by common low-voltage electrical systems in vehicles (e.g., 10-15 Vdc). In some embodiments, the low-voltage signal L may be an alternating current (AC) electrical signal at a common AC voltage (e.g., 120 Vac or 240 Vac). The low-voltage signal L may be received by the switch circuit 114. In some embodiments, multiple branches of the low-voltage signal (e.g., La-Ln) may be presented by the switch circuit 114 through the cables 104a-104n to the charging handles 124a-124n.

A fuel cell control signal (e.g., F) may be exchanged between the controller 122 and the fuel cell generator 110. The fuel cell control signal F may transfer control information from the controller 122 to the fuel cell generator 110. The fuel cell control signal F may also transfer data from the fuel cell generator 110 back to the controller 122. A DC boost converter control signal (e.g., D) may be exchanged between the controller 122 and the DC boost converter circuit 112. The DC boost converter control signal D may transfer control information from the controller 122 to the DC boost converter circuit 112. The DC boost converter control signal D may also transfer data from the DC boost converter circuit 112 back to the controller 122. A switch control signal (e.g., X) may be exchanged between the controller 122 and the switch circuit 114. The switch control signal X may transfer control information from the controller 122 to the switch circuit 114. The switch control signal X may also transfer data from the switch circuit 114 back to the controller 122.

The fuel cell generator 110 may implement one or more fuel cell stacks. The fuel cell generator 110 is generally operational to generate electrical power from the fuel H2. The electrical power may be presented in the stack output signal S to the DC boost converter circuit 112. The stack output signal S may be generated in a range of approximately 275 Vdc to approximately 400 Vdc. The electrical power conveyed by the stack output signal S may range from approximately 100 kilowatts to approximately 750 kilowatts. Other ranges of electrical power may be implemented to meet the design criteria of a particular application.

The DC boost converter circuit 112 may implement one or more DC-to-DC boost converter circuits. The DC boost converter circuit 112 is generally operational to convert the voltage range of the stack output signal S into the recharge signal R with a voltage range suitable to recharge the electric vehicles 94a-94n. In the second mode, the DC boost converter circuit 112 may also be operational to convert the voltage range of the stack output signal S into the local signal E with a voltage range suitable for recharging the rechargeable energy storage system 116, powering the portable inverter 120 and powering the fuel cell plant circuit 118. In various embodiments, a very large fuel cell generator 110 and different types of DC boost converter circuits 112 (e.g., voltage step down power converters or buck converters) may be implemented.

The switch circuit 114 may implement a high-voltage switching circuit. The switch circuit 114 is generally operational to route (or switch) the recharge signal S to the cables 104a-104n. The switch circuit 114 may route the local signal E to the portable inverter 120, the fuel cell plant circuit 118 and the rechargeable energy storage system 116. The high-voltage signal may be routed by the switch circuit 114 to the fuel cell plant circuit 118 and the portable inverter 120. The switch circuit 114 may also route the low-voltage signal L from the portable inverter 120 to the cables 104a-104n.

The rechargeable energy storage system 116 may implement one or more electrical energy storage devices. The rechargeable energy storage system 116 is generally operational to store electrical energy received from the DC boost converter circuit 112 via the local signal E while the generator 100 is in the second mode. The rechargeable energy storage system 116 may also be operational to present electrical power in the high-voltage signal H while the generator 100 is in the first mode. In various embodiments, the rechargeable energy storage system 116 may be implemented with multiple high-voltage batteries. Other electrical energy storage technologies may be implemented to meet the design criteria of a particular application.

The fuel cell plant circuit 118 may implement a variety of electrical, pneumatic and thermal devices that support operations of the fuel cell stacks within the fuel cell generator 110. The fuel cell plant circuit 118 may convert the electrical power in the plant signal P into the auxiliary signal A and the compressor signal C.

The portable inverter 120 may implement a DC-to-DC converter and/or a DC-to-AC converter. The portable inverter 120 is generally operational to convert the high voltage received in the portable signal B to a low voltage in the low-voltage signal L. In various embodiments, the low DC voltage may be in a range of approximately 10 Vdc to approximately 15 Vdc. In other embodiments, the low AC voltage may be in a range of approximately 110 Vac to approximately 130 Vac (e.g., 120 Vac). In still other embodiments, the low AC voltage may in a range of approximately 220 Vac to approximately 270 Vac (e.g., 240 Vac). In some situations, the low AC voltages may be act as as Level 1 and/or Level 2 charging stations. In designs that do not provide the multiple low-voltage signals La-Ln to the electric vehicles 94a-94n, the portable inverter 120 may be eliminated.

The controller 122 may implement control logic and/or software that controls the overall operation of the generator 100. The controller 122 may control a mode of operation of the generator 100. In various embodiments, the controller 122 may establish a first mode of operation by controlling the DC boost converter circuit 112 and the switch circuit 114 to transfer all of the electrical power generated by the fuel cell generator 110 to the electric vehicles 94a-94n plugged into the charging handles 124a-124n. The controller 122 may establish a second mode of operation by commanding the DC boost converter circuit 112 and the switch circuit 114 to generate the local signal E and route the local signal E to the fuel cell plant circuit 118, the rechargeable energy storage system 116 and the portable inverter 120.

The controller 122 is further operational to control the generation of the stack output signal S by the fuel cell generator 110 via the fuel cell control signal F. The controller 122 may also be operational to control the DC boost converter circuit 112. The recharge signal R may be adjusted by commands sent by the controller 122 in the DC boost converter control signal D to the DC boost converter circuit 112. Routing of the recharge signal R and the low-voltage signal L to the cables 104a-104n may be adjusted via the switch control signal X.

The charging handles 124a-124n may implement electric vehicle charging handles. The charging handles 124a-124b may be connectable and disconnectable from the electric vehicles 94a-94n. Each charging handle 124a-124n may by operational to transfer a corresponding one of the multiple recharge signals Ra-Rn from the generator 100 to a corresponding electric vehicle 94a-94n. In various embodiments, each charging handle 124a-124n may also be operational to transfer a corresponding one of the multiple low-voltage signals La-Ln to the corresponding electric vehicle 94a-94n. In other embodiments, the multiple low-voltage signals La-Ln may not flow through the charging handles 124a-124n. Where both the multiple recharge signals Ra-Rn and the multiple low-voltage signals La-Ln are provided to the electric vehicles 94a-94n, each charging handle 124a-124n may be a unified handle that transfers both voltage levels concurrently. In some designs, each charging handle 124a-124n may be implemented as two charging handles, one handle for the high voltages in the multiple recharge signals Ra-Rn and another handle for the low voltage in the multiple the low-voltage signals La-Ln.

Figure 3:
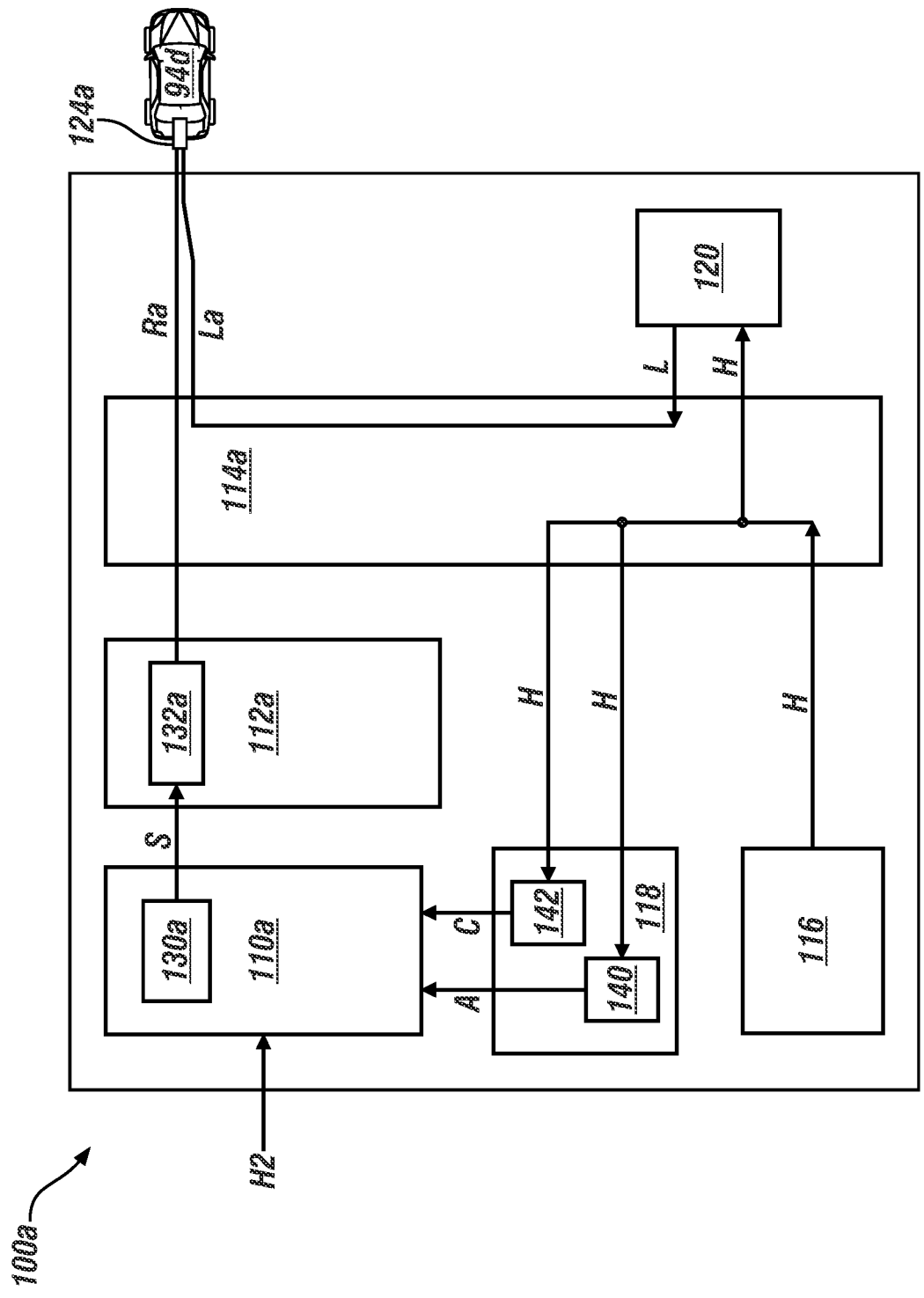
FIG. 3 is a schematic diagram of a generator operating in a first mode in accordance with an exemplary embodiment.

Referring to FIG. 3, a schematic diagram of an example implementation of a generator 100a operating in the first mode is shown in accordance with an exemplary embodiment. The generator 100a may be a variation of the generator 100. The generator 100a generally comprises a fuel cell generator 110a, a DC boost converter circuit 112a, a switch circuit 114a, the rechargeable energy storage system 116, the fuel cell plant circuit 118 and the portable inverter 120.

The fuel cell generator 110a may be a variation of the fuel cell generator 110. The fuel cell generator 110a generally comprises a first fuel cell stack 130a. The first fuel cell stack 130a may be operational to convert the fuel H2 into the electrical power in the stack output signal S.

The DC boost converter circuit 112a may be a variation of the DC boost converter circuit 112. The DC boost converter circuit 112a generally comprises a first boost converter (or voltage step converter) circuit 132a. While in the first mode, the first boost converter circuit 132a is generally operational to convert the stack output signal S into a first recharge signal (e.g., Ra). While in the second mode, the first boost converter circuit 132a may convert the stack output signal S into the local signal E.

The switch circuit 114a may be a variation of the switch circuit 114. The switch circuit 114a may be operational to route the first recharge signal Ra, the local signal E, the low-voltage signal L, the portable signal B, the plant signal P and the high-voltage signal H.

The fuel cell plant circuit 118 generally comprises auxiliary loads 140 and a compressor power inverter circuit 142. The auxiliary loads 140 may receive the high-voltage signal H and generate the auxiliary signal A. The compressor power inverter circuit 142 may receive the high-voltage signal H and generate the compressor signal C.

The auxiliary loads 140 may implement a combination of electrical, pneumatic and/or thermal devices. The auxiliary loads 140 may include one or more heating elements, one or more compressors, one or more 12 Vdc inverters and control circuitry.

The compressor power inverter circuit 142 may implement a compressor power inverter module. The compressor power inverter circuit 142 is generally operational to generate electrical power in the compressor signal C from electrical power received in the compressor plant signal Pc. The compressor signal C may be transferred to a compressor in the fuel cell generator 110a. In various embodiments, the compressor power inverter circuit 142 may be one of the auxiliary loads 140.

The generator 100a is generally operational to directly charge one of the electric vehicles 94a-94n at a time (e.g., 94d). In the first mode, electrical power generated by the first fuel cell stack 130a may be boosted to an intended voltage by the first boost converter circuit 132a, routed through the switch circuit 114a to the first charging handle 124a and into the electric vehicle 94d. The generator 100a may not incur losses from unnecessary power conversion steps typically found in common fuel cell charging stations. Where implemented, the portable inverter 120 may use electrical power stored in the rechargeable energy storage system 116 to generate the low-voltage signal L. The first low-voltage signal La may also be routed through the switch circuit 114a, transferred to the first charging handle 124a and into the electric vehicle 94d.

Figure 4:
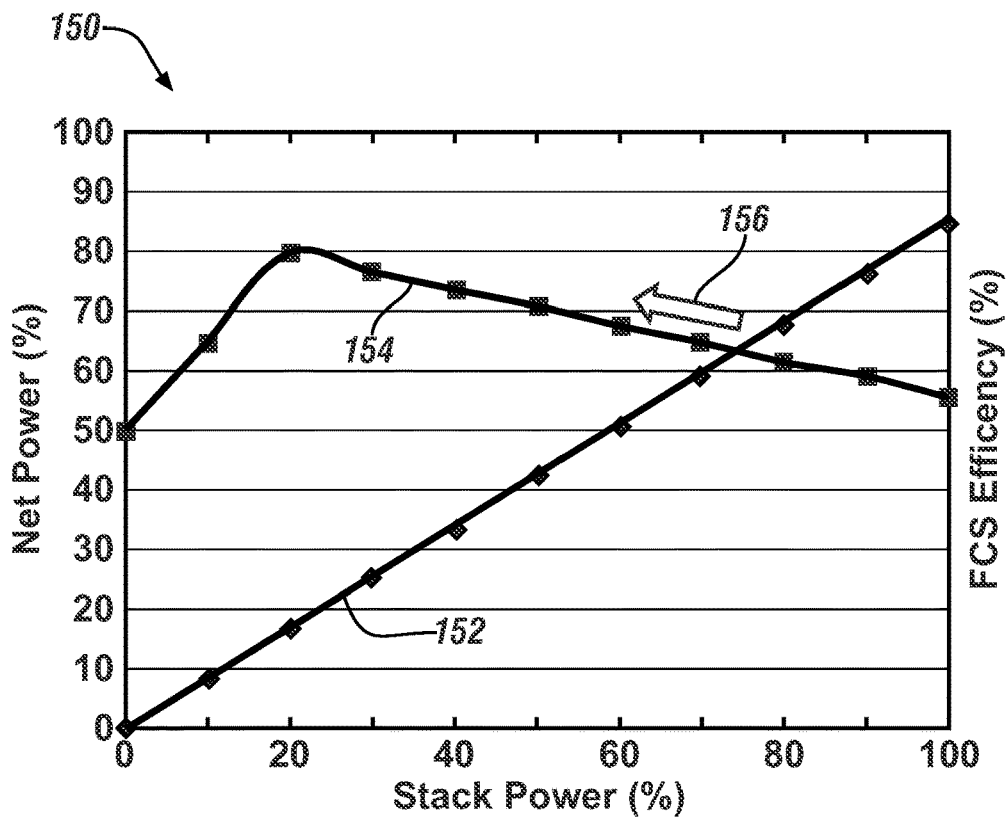
FIG. 4 is a graph of a fuel cell stack efficiency of the generator of FIG. 3 in the first mode in accordance with an exemplary embodiment.

Referring to FIG. 4, a graph 150 of an example fuel cell stack (FCS) efficiency in the first mode is shown in accordance with an exemplary embodiment. A left index of the graph 150 may be a fuel cell stack net output power shown in a range of 0% to 100%. A right index of the graph 150 may be a system efficiency shown in a range of 0% to 100%. A bottom index of the graph 150 may be a stack power shown in a range of 0% to 100%.

An efficiency curve 154 generally illustrated the system efficiency as the stack power is increased. A power curve 152 may illustrate the net power as the stack power is increased. An arrow 156 may indicate that the system efficiency may be increased by operating at a lower stack power.

While operating in the first mode, the generator 100a may transfer the complete electrical power generated by the first fuel cell stack 130a to the electric vehicle 94d. As such, no losses may be present due to extra power conversion steps other than in the first boost converter circuit 132a. The first fuel cell stack 130a may operate at a lower setpoint (e.g., the arrow 156) thereby yielding a higher efficiency. Furthermore, a full capability of the first fuel cell stack 130a may be available to sell to customers (e.g., stack power vs net power).

Figure 5:
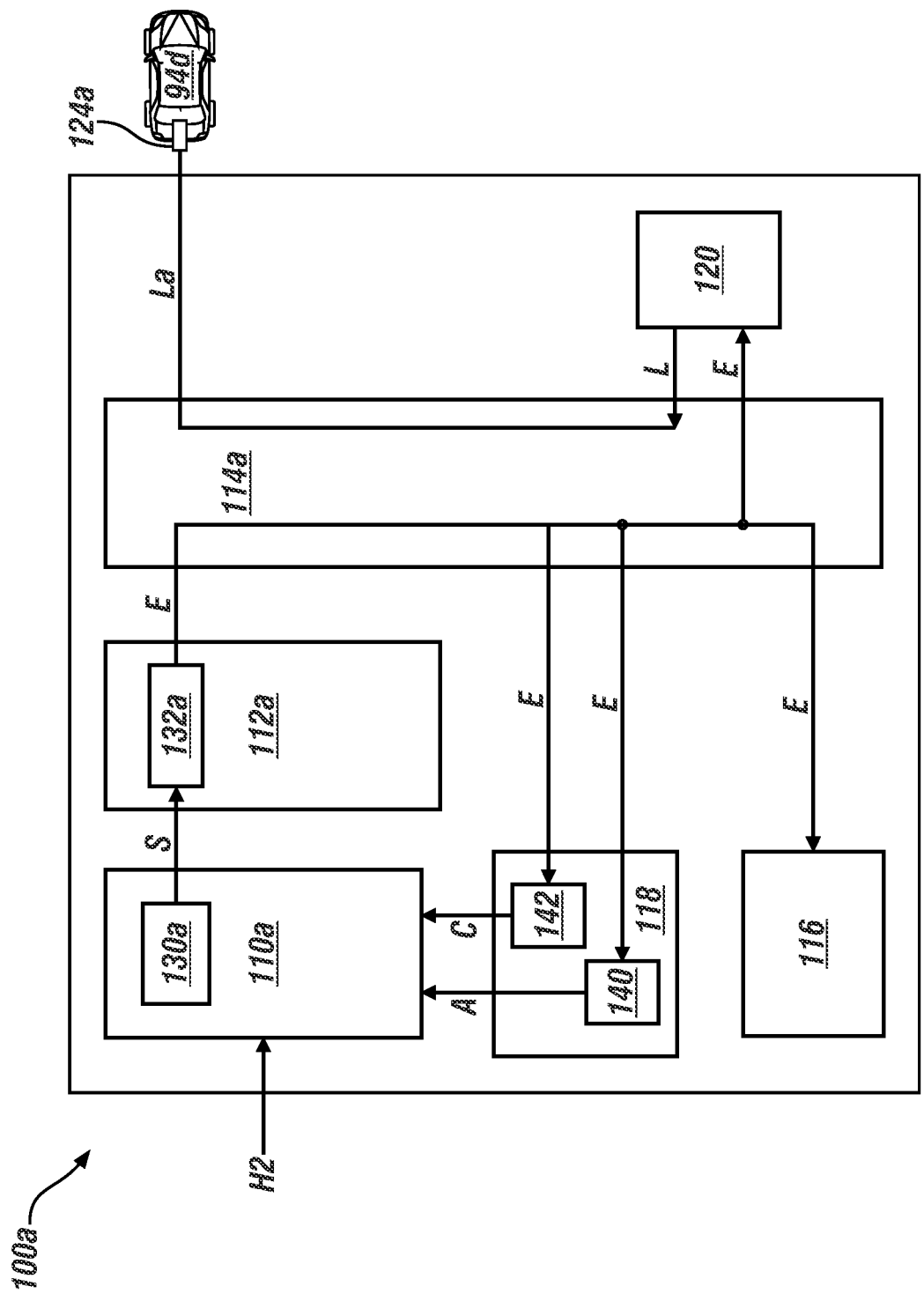
FIG. 5 is a schematic diagram of the generator of FIG. 3 operating in a second mode in accordance with an exemplary embodiment.

Referring to FIG. 5, a schematic diagram of an example implementation of the generator 100a operating in the second mode is shown in accordance with an exemplary embodiment. The first boost converter circuit 132a may be controlled by the controller 122 (FIG. 2) to convert the voltage in the stack output signal S to another voltage in the local signal E. The switch circuit 114a may be controlled by the controller 122 to send the local signal E to the auxiliary loads 140, the compressor power inverter circuit 142, the rechargeable energy storage system 116 and the portable inverter 120.

While the generator 100a is in the second mode, the electric vehicle 94d may not be charged by the first recharge signal Ra. If the first low-voltage signal La is implemented in the charging handle 124a, the electric vehicle 94d may still receive some electrical power to change internally low-voltage batteries.

Figure 6:
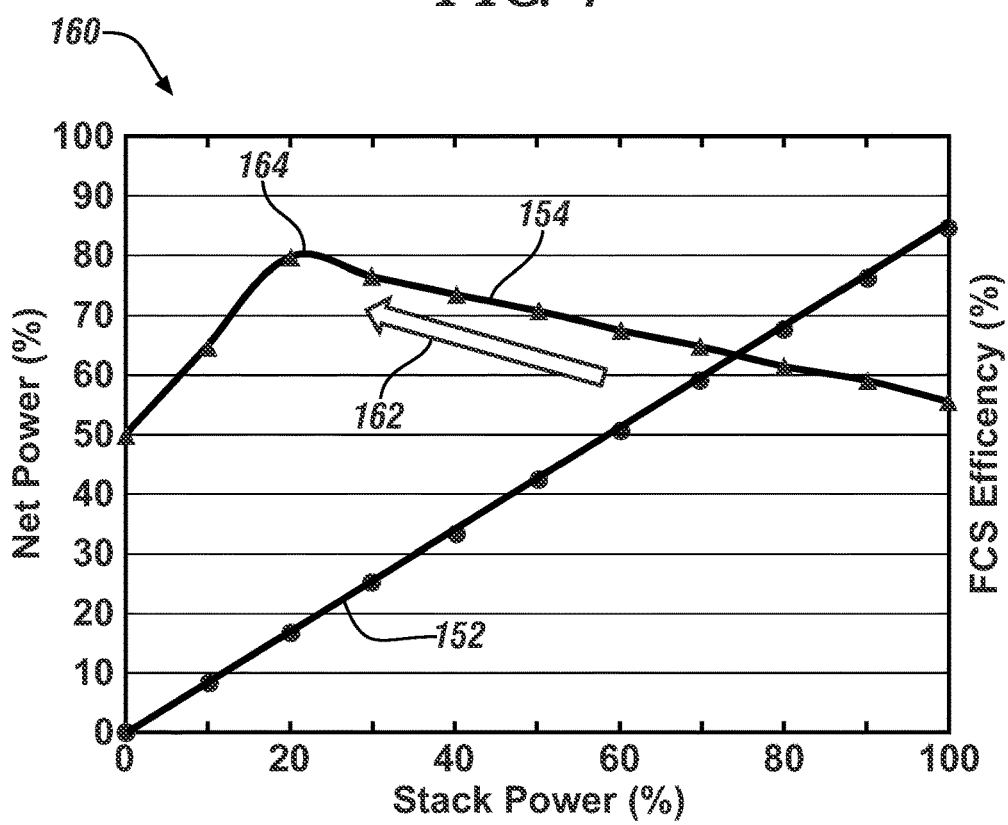
FIG. 6 is a graph of the fuel cell stack efficiency of the generator of FIG. 3 in the second mode in accordance with an exemplary embodiment.

Referring to FIG. 6, a graph 160 of an example fuel cell stack efficiency in the second mode is shown in accordance with an exemplary embodiment. The graph 160 may have the same indices as the graph 150. The graph 160 may include the efficiency curve 154, the power curve 152, an arrow 162 and a peak efficiency point 164.

While the generator 100a is operating in the second mode, the first fuel cell stack 130a may produce electrical power in a range of approximately 10% to 30% of a maximum electrical power created to charge the electric vehicles 94a-94n. The lower electrical power may be sufficient to power the auxiliary loads 140, the compressor power inverter circuit 142, the portable inverter 120 and charge the rechargeable energy storage system 116. As a result, the first fuel cell stack 130a may run at or near the peak efficiency point 164. Since the first fuel cell stack 130a is operational even without an electric vehicle 94a-94n to charge, charging the rechargeable energy storage system 116 and/or powering the fuel cell plant circuit 118 may avoid fuel cell stack start/stop on every customer connection. The continuous operation may allow the first fuel cell stack 130a to productively run and avoid freeze shutdowns and freeze warmups.

Figure 7:
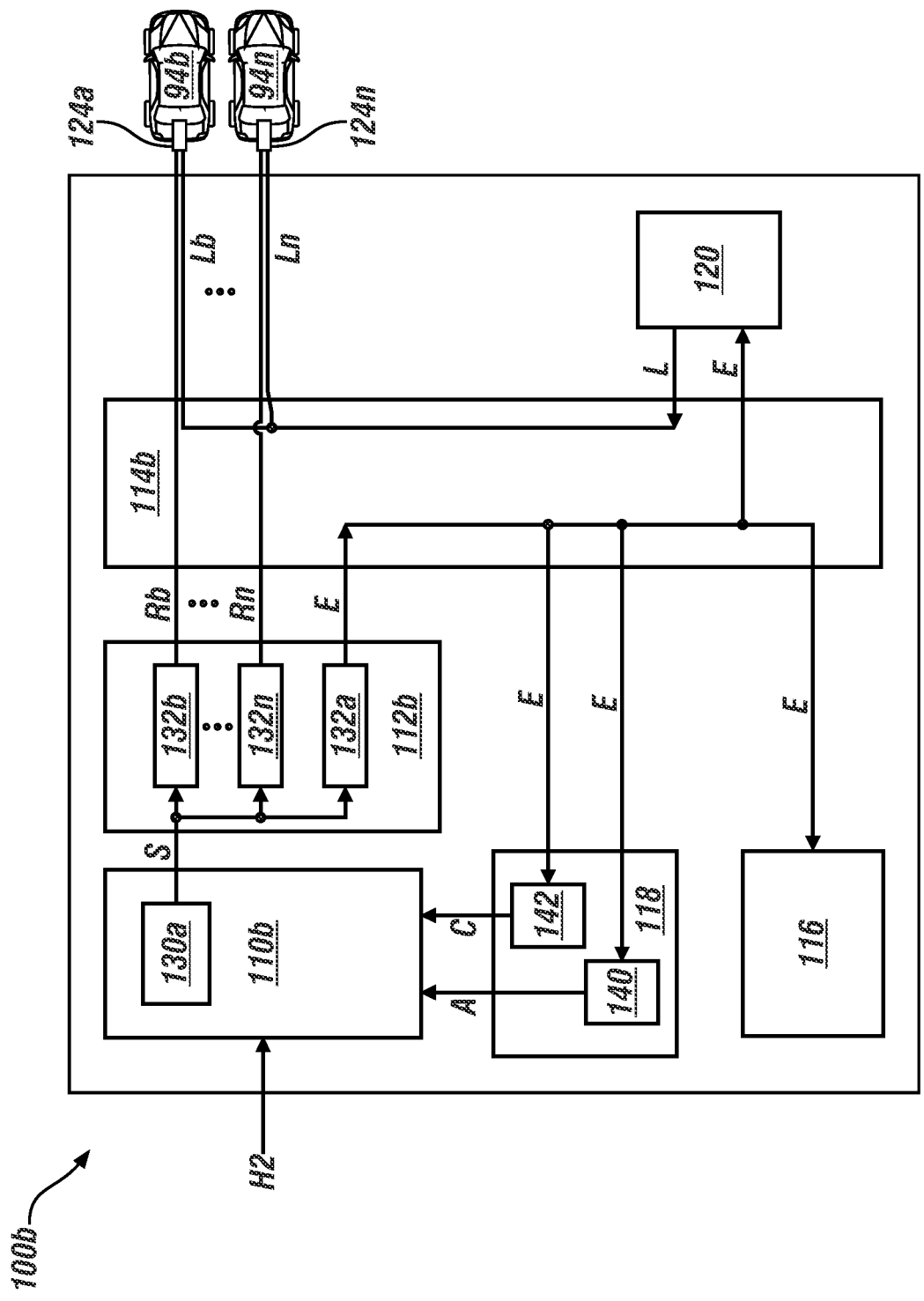
FIG. 7 is a schematic diagram of another generator operating in the first mode and the second mode simultaneously in accordance with an exemplary embodiment.

Referring to FIG. 7, a schematic diagram of an example implementation of a generator 100b operating in the first mode and the second mode simultaneously is shown in accordance with an exemplary embodiment. The generator 100b may be a variation of the generator 100 and/or 100a. The generator 100b generally comprises a fuel cell generator 110b, a DC boost converter circuit 112b, a switch circuit 114b, the rechargeable energy storage system 116, the fuel cell plant circuit 118 and the portable inverter 120.

The fuel cell generator 110b may be a variation of the fuel cell generator 110 and/or 110a. The fuel cell generator 110b generally comprises the first fuel cell stack 130a.

The DC boost converter circuit 112b may be a variation of the DC boost converter circuit 112 and/or 112a. The DC boost converter circuit 112b generally comprises a multiple boost converter circuits 132a-132n. While in the second mode, the first boost converter circuit 132a may be operational convert the stack output signal S into the local signal E. The other boost converter circuits 132b-132n may be operational to convert the stack output signal S into multiple recharge signals (e.g., Rb-Rn) in the first mode and/or the second mode.

The switch circuit 114b may be a variation of the switch circuit 114 and/or 114a. The switch circuit 114b may be operational to route the multiple recharge signals Ra-Rn, the local signal E, the low-voltage signal L, the portable signal B, the plant signal P and the high-voltage signal H.

Figure 8:
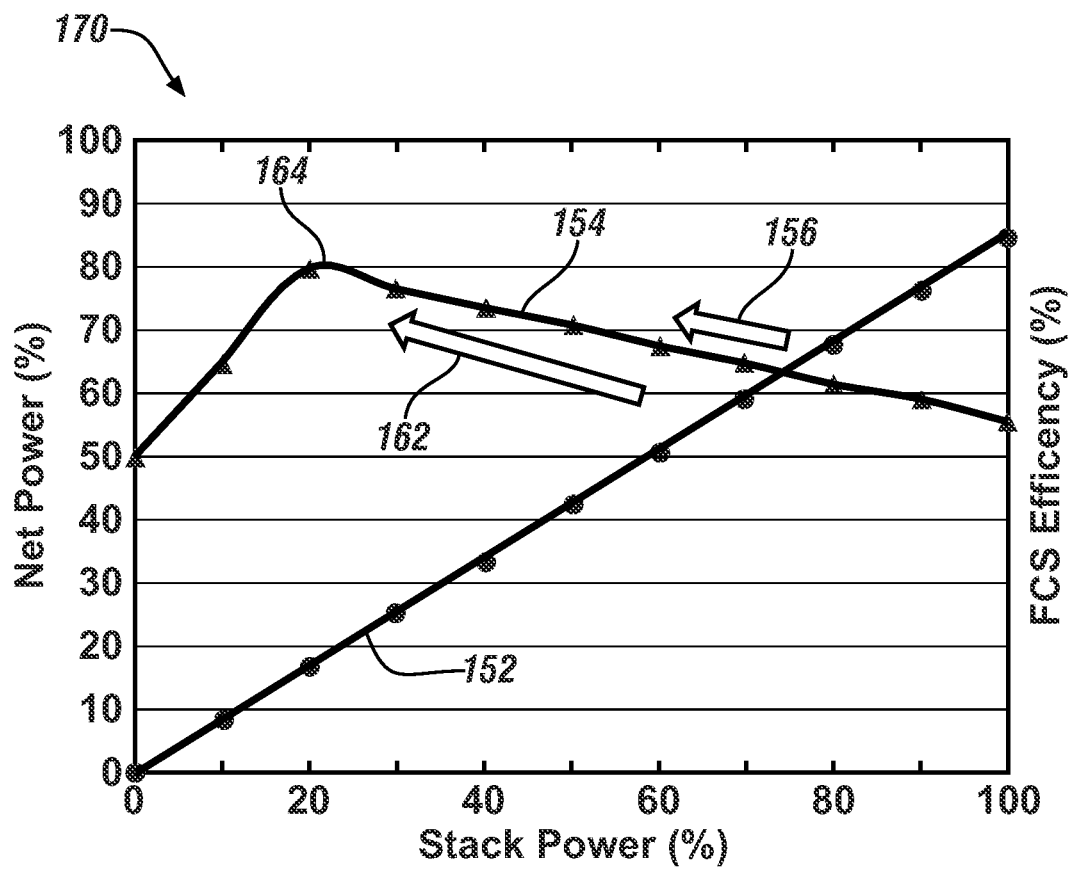
FIG. 8 is a graph of the fuel cell stack efficiency of the generator of FIG. 7 in accordance with an exemplary embodiment.

Referring to FIG. 8, a graph 170 of an example fuel cell stack efficiency is shown in accordance with an exemplary embodiment. A left index of the graph 170 may be a fuel cell stack net output power shown in a range of 0% to 100%. A right index of the graph 170 may be a system efficiency shown in a range of 0% to 100%. A bottom index of the graph 170 may be a stack power shown in a range of 0% to 100%. The graph 170 may include the efficiency curve 154, the power curve 152, the arrow 156, the arrow 162 and the peak efficiency point 164.

The generator 100b may offer benefits similar to the generator 100a. For example, the efficiency may be increased while operating in the first mode per the arrow 156. The efficiency may be increased while operating in the second mode per the arrow 162 toward the peak efficiency point 164. In addition, use of the multiple boost converter circuits 132a-132n generally allows the generator 100b to change several electronic vehicles 94a-94n concurrently. Use of the multiple boost converter circuits 132a-132n may also enable continued de-rated operation while a charge of the rechargeable energy storage system 116 is depleted. The first fuel cell stack 130a may be operated in special modes (e.g., a voltage suppress mode and a voltage recovery mode) without disturbing charging of the electric vehicles 94a-94n. The voltage suppressed mode may reduce voltage of the first fuel cell stacks 130a below a predetermined maximum voltage to protect the first fuel cell stacks 130a. The voltage recovery mode may restore the fuel cell stack voltage (e.g., the stack output signal S) by operating the first fuel cell stack 130a in a condition that removes accumulated contaminants.

Figure 9:
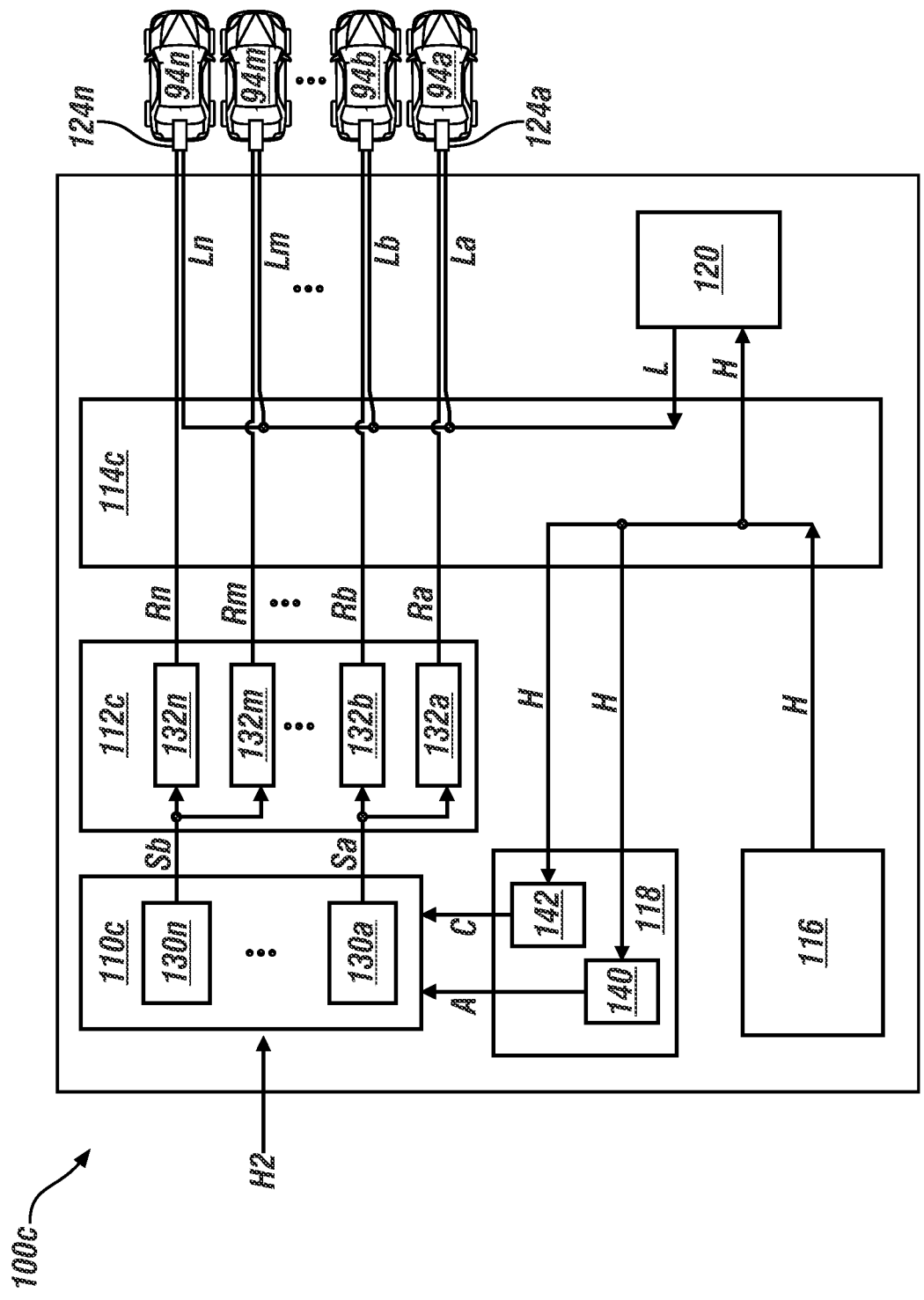
FIG. 9 is a schematic diagram of still another generator operating in the first mode in accordance with an exemplary embodiment.

Referring to FIG. 9, a schematic diagram of an example implementation of a generator 100c operating in the first mode is shown in accordance with an exemplary embodiment. The generator 100c may be a variation of the generator 100, 100a and/or 100b. The generator 100c generally comprises a fuel cell generator 110c, a DC boost converter circuit 112c, a switch circuit 114c, the rechargeable energy storage system 116, the fuel cell plant circuit 118 and the portable inverter 120.

The fuel cell generator 110c may be a variation of the fuel cell generator 110, 110a and/or 110b. The fuel cell generator 110c generally comprises multiple fuel cell stacks 130a-130n. Each fuel cell stack 130a-130n may be operational to convert the fuel H2 into the electrical power in one of multiple stack output signals (e.g., Sa and Sb). Each of the multiple boost converter circuits 132a-132n may receive electrical power through a corresponding one of the multiple stack output signals Sa and Sb.

The DC boost converter circuit 112c may be a variation of the DC boost converter circuit 112, 112a and/or 112b. The DC boost converter circuit 112c generally comprises multiple boost converter circuits 132a-132n. While operating in the first mode, each boost converter circuit 132a-132n is generally operational to convert a corresponding one of the stack output signals Sa or Sb into one of the multiple recharge signals Ra-Rn.

The switch circuit 114c may be a variation of the switch circuit 114, 114a and/or 114b. The switch circuit 114c may be operational to route the multiple recharge signals Ra-Rn, the low-voltage signal L, the portable signal B, the plant signal P and the high-voltage signal H. The switch circuit 114c may include a switchable high-voltage bus.

The generator 100c may offer benefits similar to the generator 100b. Furthermore, the generator 100c may implement the multiple fuel cell stacks 130a-130n to accommodate high-power electric vehicles 94a-94n through the switchable high-voltage bus in the switch circuit 114c. The generator 100c may allow for de-rated operations while the charge in the rechargeable energy storage system 116 is depleted. The fuel cell stack special modes (e.g. the voltage suppression mode and the voltage recovery mode) may be supported without disturbing customer charging.

Figure 10:
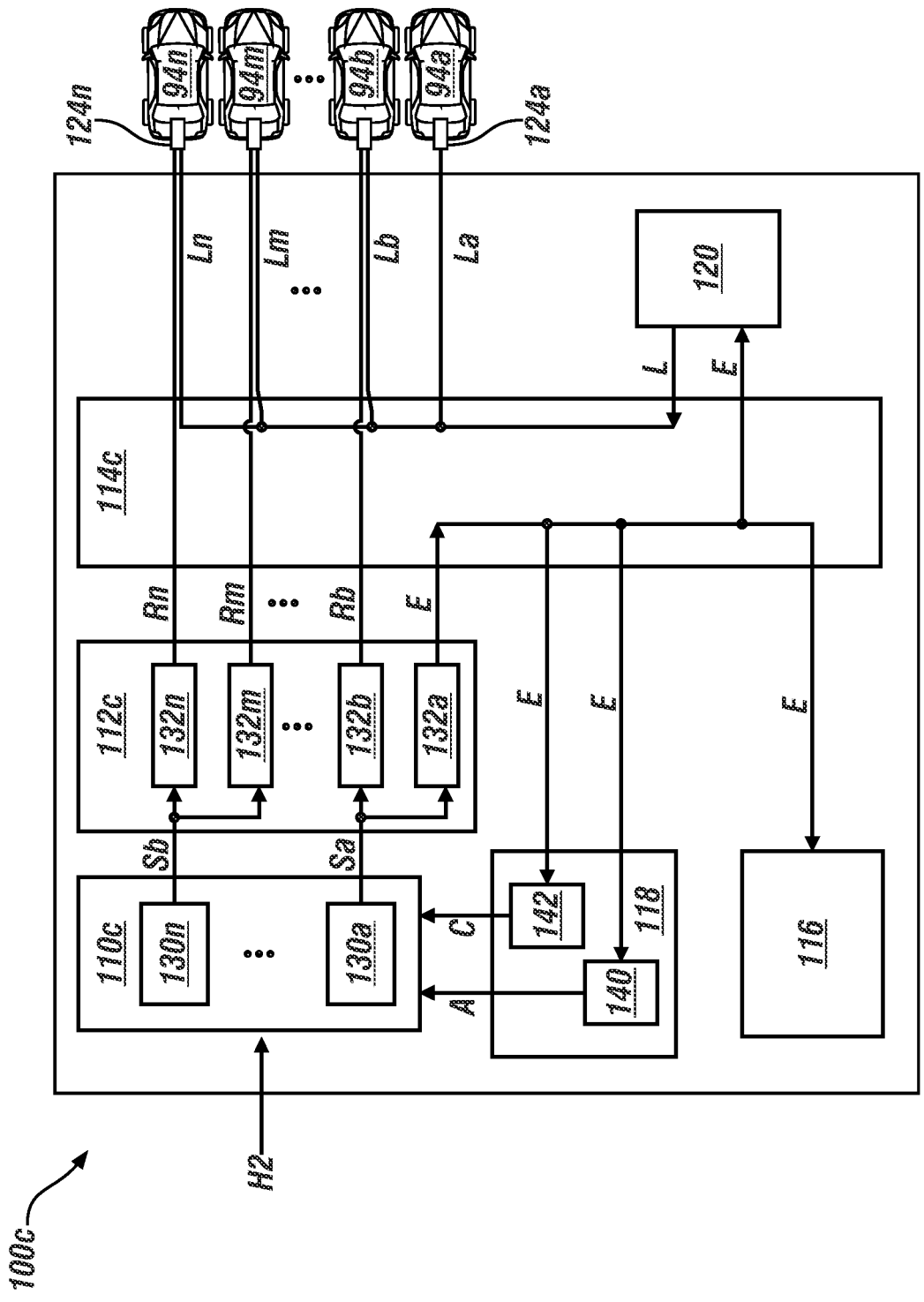
FIG. 10 is a schematic diagram of the generator of FIG. 9 operating in the first mode and the second mode simultaneously in accordance with an exemplary embodiment.

Referring to FIG. 10, a schematic diagram of an example implementation of the generator 100c operating in the first mode and the second mode simultaneously is shown in accordance with an exemplary embodiment. While in the second mode, the first boost converter circuit 132a may convert the stack output signal Sb into the local signal E to power the devices internal to the generator 100c and recharge the rechargeable energy storage system 116. The other boost converter circuits 132b-132n may convert the corresponding stack output signals Sa or Sb into the recharge signals Rb-Rn.

Figure 11:
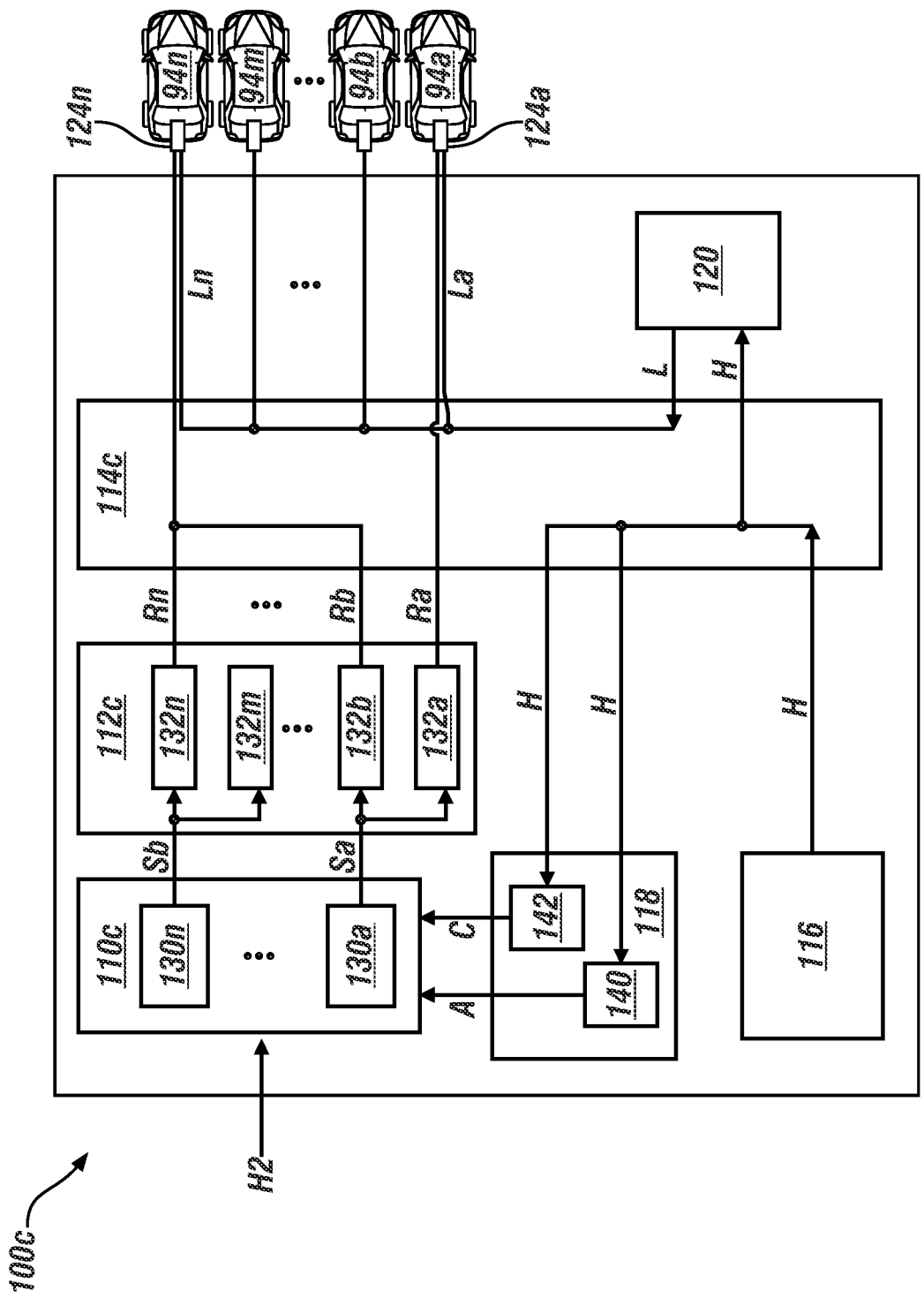
FIG. 11 is a schematic diagram of the generator of FIG. 9 accommodating a high-power customer in accordance with an exemplary embodiment.

Referring to FIG. 11, a schematic diagram of an example implementation of the generator 100c accommodating a high-power customer is shown in accordance with an exemplary embodiment. In situations where an electric vehicle 94a-94n (e.g., 94n) is a high-power electric vehicle (e.g., a commercial truck), the switch circuit 114c may be configured by the controller 122 to connect two or more of the multiple recharge signals Ra-Rn (e.g., Rn and Rb) to increase a charging current capacity. The combined recharge signals Rb and Rn may be presented in a single cable 104n and charging handle 124n to the high-power electric vehicle 94n.

Figure 12:
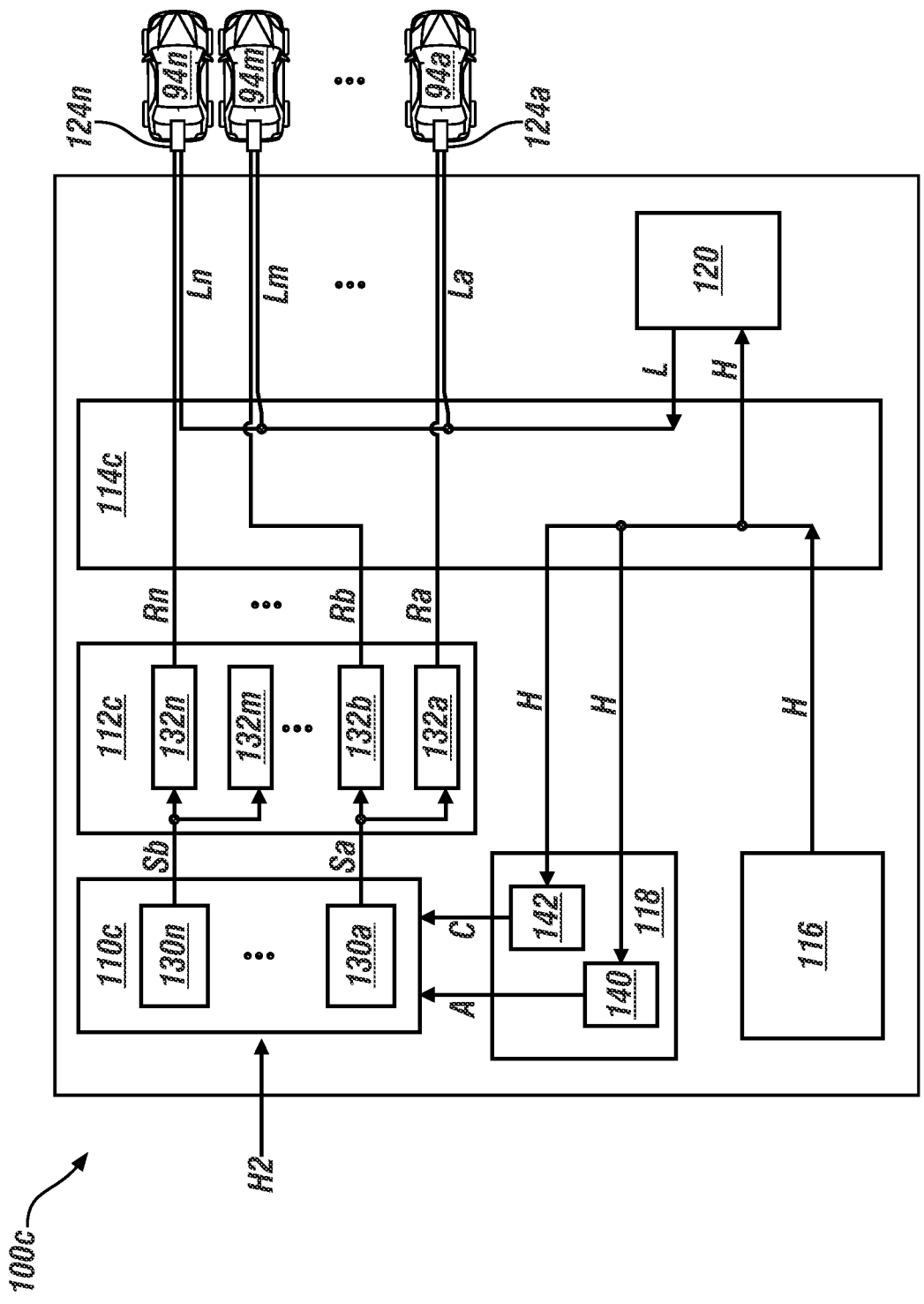
FIG. 12 is a schematic diagram of the generator of FIG. 9 with a fault condition in accordance with an exemplary embodiment.

Referring to FIG. 12, a schematic diagram of an example implementation of the generator 100c with a fault condition is shown in accordance with an exemplary embodiment. While deployed to a designated location, a failure may occur in the generator 100c. For example, the boost converter circuit 132m may stop operating while charging the electric vehicle 94m. Upon detection of the fault, the controller 122 may command the switch circuit 114c to reroute the recharge signal Rb from the idle (or low priority) boost converter circuit 132b to the cable 132m to continue charging the vehicle 132m. The rerouting of the recharge signal Rb may be provided by the switchable high-voltage bus inside the switch circuit 114c.

The controller 122 may configure the generator 100c to operate in a variety of modes. Table I may illustrate some of the modes for a design having two fuel cell stacks (e.g., FCSa and FCSb), four boost converter circuits (e.g., BCa-BCd), the rechargeable energy storage system (e.g., RESS), the fuel cell plant circuits (e.g., FC plant loads) and four electric vehicles (e.g., A-D) connected to the generator for charging. The rechargeable energy storage system 116 may be discharging (Disc) or charging (Chrg).

TABLE I

| Mode | 1 | 2 | 3 | 4 | 5 | 6 | 7 | 8 | 9 | 10 |
|---|---|---|---|---|---|---|---|---|---|---|
| FCSa | 100% | 100% | 100% | 100% | 100% | 100% | 10% | 100% | 100% | 100% |
| BCa | 50% | 50% | 100% | 100% | 100% | 100% | 10% | Fail | 50% | 100% |
| SW1A-H | Close | Close | Close | Close | Close | Close | Open | Close | Close | Open |
| SW1A-B | Open | Open | Open | Open | Close | Close | Close | Close | Open | Close |
| BCb | 50% | 50% | 0% | 0% | 0% | 0% | 0% | 50% | 50% | 0% |
| SW1B-H | Close | Close | Open | Open | Open | Open | Open | Close | Open | Open |
| SW1B-B | Open | Open | Open | Open | Open | Open | Open | Open | Close | Open |
| FCSb | 100% | 100% | 100% | 100% | 100% | 100% | Off | 100% | Off | 100% |
| BCc | 50% | 50% | 50% | 50% | 50% | 100% | Off | 50% | Off | 100% |
| SW2A-H | Close | Close | Close | Close | Open | Open | Open | Close | Close | Open |
| SW2A-B | Open | Open | Open | Open | Close | Close | Open | Open | Close | Close |
| BCd | 50% | 50% | 50% | 50% | 50% | 0% | Off | 50% | Off | 0% |
| SW2B-H | Close | Open | Close | Open | Close | Open | Open | Open | Open | Open |
| SW2B-B | Open | Close | Open | Close | Open | Open | Open | Close | Open | Open |
| SWHVB-B | Open | Close | Open | Close | Open | Open | Close | Open | Open | Close |
| RESS | Disc | Chrg | Disc | Chrg | Disc | Disc | Chrg | Disc | Disc | Chrg |

Modes:

1: Charge vehicles A, B, C, D at normal rate.
2: Charge vehicles A, B, C at normal rate; recharge RESS to support FC plant loads.
3: Charge vehicle A at 2x rate; charge vehicles C and D at normal rate.
4: Charge vehicle A at 2x rate; charge vehicle C at normal rate; recharge RESS and support FC plant loads.
5: Charge vehicle A at 3x rate; charge vehicle D at normal rate.
6: Charge vehicle A at 4x rate.
7: No vehicles charging; recharge RESS and support FC plant loads.
8: Charge vehicles A, B, C; BCa is broken.
9: Charge vehicles A and C; FCSb is off.
10: No vehicles charging; recharge RESS and support FC plant loads.

The values of 100%, 50% and 10% may be examples percentages. Other percentages may be implemented to meet the design criteria of a particular application. The fuel cell stacks 130a-130n may be fully throttleable and capable of control from 0% to 100% output power. The boost converter circuit 132a-132n may be fully throttleable and capable of control from 0% to 100% output power. Other combinations may be implemented to meet the design criteria of a particular application.

Figure 13:
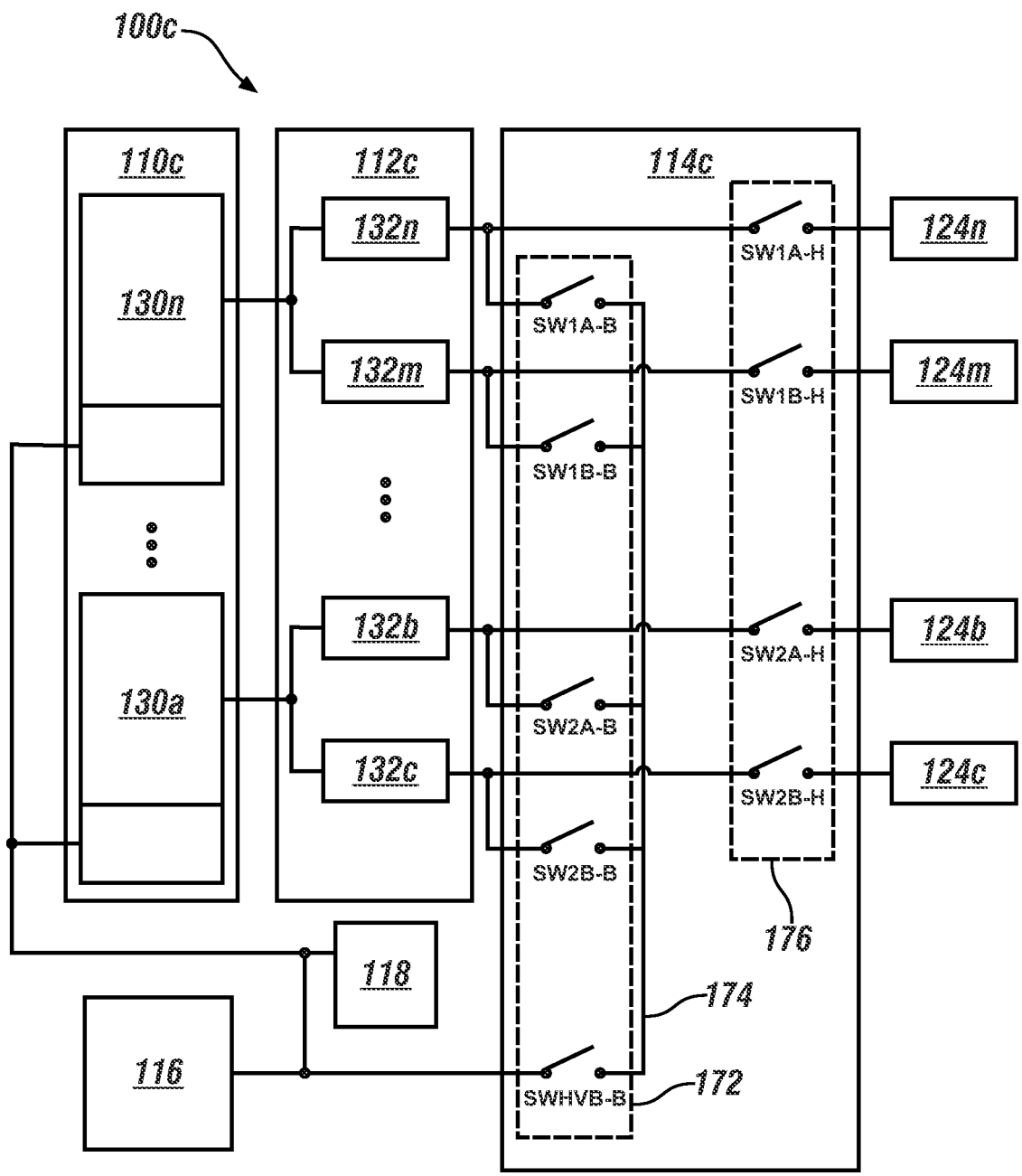
FIG. 13 is a detailed schematic diagram of a switch circuit in accordance with an exemplary embodiment.

Referring to FIG. 13, a detailed schematic diagram of an example implementation of the switch circuit 114c is shown in accordance with an exemplary embodiment. The switch circuit 114c generally comprises multiple first switches 172, a high-voltage bus 174 and multiple second switches 176.

Each first switch (e.g., switches SW1A-B to SWHVB-B) within the multiple first switches 172 may be electrically connected between the boost converter circuit 132a-132n and the high-voltage bus 174. Each first switch may be independently controlled by the controller 122 into either an open condition or a closed condition.

Each second switch (e.g., switches SW1A-H to SW2B-H) within the multiple second switches 176 may be electrically connected between the charging handles 124a-124n and the corresponding boost converter circuit 132a-132n. Each second switch may be independently controlled by the controller 122 into either an open condition or a closed condition.

In various embodiments, the switch circuit 114c may include a low-voltage bus directly connected to the portable inverter 120 and multiple third switches that switch the low-voltage signal L through the cables 104a-104n to the charging handles 124a-124n.

Figure 14:
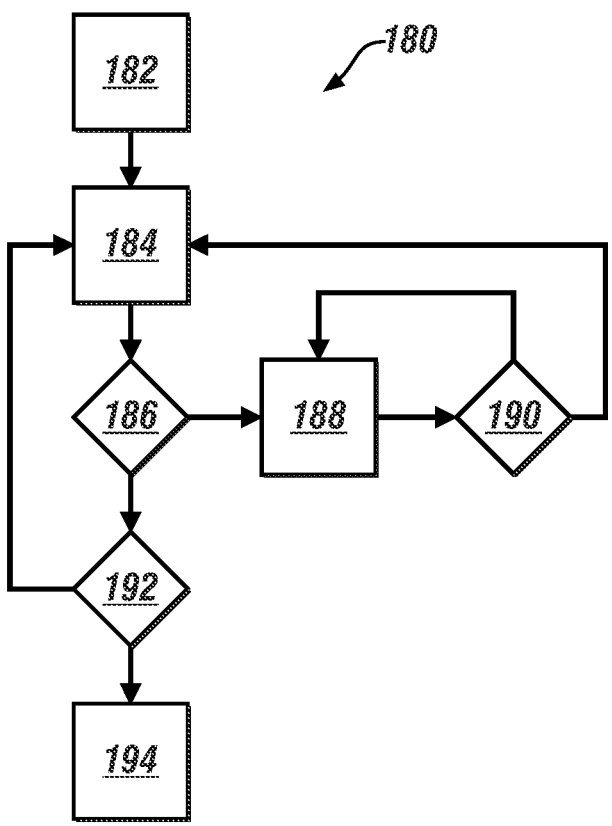
FIG. 14 is a flow diagram of a method for operating the generator in accordance with an exemplary embodiment.

Referring to FIG. 14, a flow diagram of an example method 180 of operating the generator 100 is shown in accordance with an exemplary embodiment. The method (or process) 180 generally comprises a step (or state) 182, a step (or state) 184, a step (or state) 186, a step (or state) 188, a step (or state) 190, a step (or state) 192 and a step (or state) 194. The sequence of steps 182 to 194 is shown as a representative example. Other step orders may be implemented to meet the criteria of a particular application.

In step 182, the generator 100 may be powered up in the first mode. Once the fuel cell generator 110 starts to generate electrical power, the controller 122 may set the generator 100 in the second mode in step 184 to change the rechargeable energy storage system 116. In decision step 186, the controller 122 may determine if an electric vehicle 94a-94n is connected and ready to be charged. If yes, the controller 122 may command the generator 100 into the first mode in step 188 to make the full capacity of the fuel cell generator 110 available for charging.

While the charging is taking place, the controller 122 may monitor the generator 100 in decision step 190 for specific events. For example, one of the events may be that no electric vehicles 94a-94n are currently being charged. Another event may be the rechargeable energy storage system 116 running out of power. Other events may be implemented to meet the design criteria of a particular application. If no event has occurred, the method 180 may loop back to step 188 to continue the charging. If one or more events is detected, the method 180 may loop back to step 184 where the controller 122 places the generator 100 back into the second mode.

If decision step 186 determines that no charging is taking place, the controller 122 may monitor the time in decision step 192. If it is not time to power down the generator 100, the method 180 may return to the step 184 and continue operations in the second mode. If it is time to power down the generator 100, the controller 122 may sequence down the generator 100 in the step 194.

Figure 15:
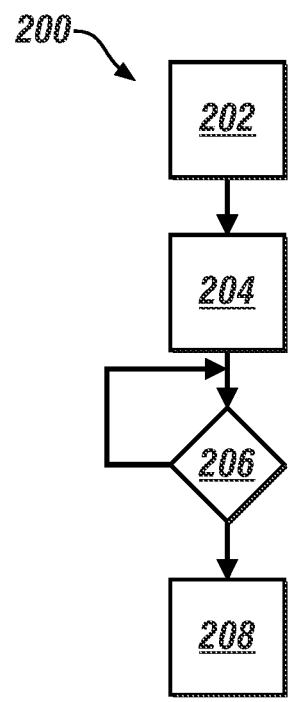
FIG. 15 is a flow diagram of a method for voltage suppression in accordance with an exemplary embodiment.

Referring to FIG. 15, a flow diagram of an example method 200 for voltage suppression is shown in accordance with an exemplary embodiment. The method (or process) 200 generally comprises a step (or state) 202, a step (or state) 204, a step (or state) 206 and a step (or state) 208. The sequence of steps 202 to 208 is shown as a representative example. Other step orders may be implemented to meet the criteria of a particular application.

In step 202, the controller 122 may command one or more of the fuel cell stacks 130a-130n into the voltage suppression mode. In step 204 the controller 122 may instruct the boost converter circuits 132a-132n to adjust the DC-to-DC conversions to account for the voltage suppression effect on the stack output signal S. The adjustment may maintain the recharge signals Ra-Rn within a specified voltage range. The controller 122 may monitor fuel cell stacks 130a-130n in the voltage suppression mode in decision step 206. If the voltage suppression mode should be maintained, the method 200 may wait. Once the controller 122 determines that the voltage suppression mode should end, the controller 122 may control the fuel cell stacks 130a-130n and the boost converter circuits 132a-132n back into a normal operating mode in the step 208.

Figure 16:
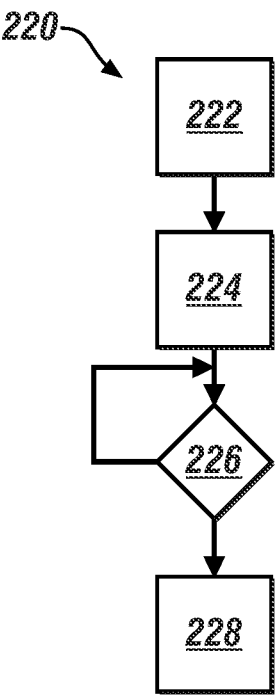
FIG. 16 is a flow diagram of a method for voltage recovery in accordance with an exemplary embodiment.

Referring to FIG. 16, a flow diagram of an example method 220 for voltage recovery is shown in accordance with an exemplary embodiment. The method (or process) 220 generally comprises a step (or state) 222, a step (or state) 224, a step (or state) 226 and a step (or state) 228. The sequence of steps 222 to 228 is shown as a representative example. Other step orders may be implemented to meet the criteria of a particular application.

In step 222, the controller 122 may command one or more of the fuel cell stacks 130a-130n into the voltage recovery mode. In step 224 the controller 122 may instruct the boost converter circuits 132a-132n to adjust the DC-to-DC conversions to account for the voltage recovery effect on the stack output signal S. The adjustment may maintain the recharge signals Ra-Rn within the specified voltage range. The controller 122 may monitor fuel cell stacks 130a-130n in the voltage recovery mode in decision step 226. If the voltage recovery mode should be maintained, the method 220 may wait. Once the controller 122 determines that the voltage recovery mode should end, the controller 122 may control the fuel cell stacks 130a-130n and the boost converter circuits 132a-132n back into a normal operating mode in the step 228.

In various embodiments, the generator 100 may implement a fuel cell stack-based mobile DC fast charger for electric vehicle fleets while a fixed-location recharging stations infrastructure is developed. The fuel cell stack-based mobile DC fast charger may have a high capacity compared to battery-only versions. The fuel cell stack-based mobile DC fast charger may be capable of charging many (e.g., greater than 50) vehicles continuously at a maximum rate before requiring a resupply of fuel (e.g. with commercially available portable hydrogen systems, the generator 100 may charge more than 50 fully depleted battery electric vehicles).

The mobile fuel cell stack-based mobile DC fast charger may be suitable for scouting and data collection prior to committing to permanent location. The mobile fast charger may improve parking situations for electric vehicles in an area where a parking structure already exists but lacks built-in charging stations. The mobile fast charger may be available in urban environments with minimal disruption to existing real estate and infrastructure. The mobile fast charger may match demand/supply near real time to maximize utilization (e.g. seasonal locations such as ski slopes in the winter, beaches in the summer and highway rest stops during long holiday weekends), geographic (e.g., concerts, festivals, sporting events), or disaster relief.

An extreme capacity outpost may be provided by the mobile fast charger at frontier locations. For example, charge points connecting cities may be established where none currently exist. Deployable mobile fast chargers may quickly add electrical power capacity at any site location and accelerates adoption of electric vehicles.

A mobile phone application may provide a monetized opportunity for both customer and operators. A current lack of reliable and available electric vehicle charging stations may be remedied by the mobile fast charger option. Large-scale DC fast charging may be available without imposing stress on a local electric grid (e.g., duck curve) using flexible hydrogen sources. The mobile fast chargers may provide backup power with a mobile, on-demand, modular, and scalable power source. The mobile fast chargers may also provide an electric vehicle charging siting tool for fleet customers allowing the correct sizing of permanent facilities. Furthermore, the mobile fast chargers generally provide zero-emission, turnkey charging solution for battery electric vehicle fleets.

By decoupling production of the electric power by the fuel cell generator from an overhead used to support the fuel cell generator, the following benefits may be achieved. More sellable power may be available (e.g., net (sellable)+auxiliaries (overhead)=gross stack power.) By deferring auxiliary power draws while charging demand is high, more product may be sold (e.g., gross vs net).

System efficiency is generally higher. The higher efficiency may be derived from reducing the number of power conversion steps and by reducing the fuel cell stack load.

The number of fuel cell stack on/off cycles may be reduced. By deferring auxiliary loads to a battery and covering the auxiliary load drain on the battery at a later time, the fuel cell stacks may be kept running in between customers and avoid on/off cycles.

An addition of the high-voltage bus in the switch circuits generally provides many benefits with multistack/multiboost converter configurations, including higher power charging, flexible operating modes and bypassing failed system components. The mobile fast charger may also mitigate range anxiety of customers and relieve infrastructure pinch points.

The mobile charger architecture generally implements fewer conversion steps than normal for delivering power to a load. Additionally, the use of multiple boost converter circuits may allow operation of the fuel cell generator loads from a local battery that may be recharged at a later time. The mobile charger architecture may reduce design complexity to meet specifications.

While the best modes for carrying out the design have been described in detail, those familiar with the art to which this design relates will recognize various alternative designs and embodiments for practicing the design within the scope of the appended claims.

What is claimed is:

1. A mobile fuel cell system comprising:
    a fuel cell generator disposed on a mobile platform, wherein the fuel cell generator has at least one fuel cell stack operable to generate electrical power in a stack output signal;
    a plurality of boost converter circuits connected to the fuel cell generator, wherein:
        the plurality of boost converter circuits are operable to convert the stack output signal into a plurality of recharge signals while in a first mode;
        one of the plurality of boost converter circuits is operable to convert the stack output signal into a local signal while in a second mode; and
        the stack output signal has a different voltage than the plurality of recharge signals;
    a plurality of charging handles connectable to a plurality of electric vehicles, wherein the plurality of charging handles are operable to transfer the plurality of recharge signals to the plurality of electric vehicles;
    a switch circuit connected to the plurality of boost converter circuits and the plurality of charging handles, wherein the switch circuit is operable to:
        present corresponding ones of the plurality of recharge signals to corresponding ones of the plurality of charging handles while corresponding ones of the electric vehicles are being charged;
        remove the corresponding ones of the plurality of recharge signals from the corresponding ones of the plurality of charging handles while the corresponding ones of the plurality of electric vehicles are not being charged; and
        present the local signal while in the second mode;
    an auxiliary load connected to the fuel cell generator and the switch circuit;
    a rechargeable energy storage circuit connected to the switch circuit and the auxiliary load, wherein the rechargeable energy storage circuit is operable to:
        power the auxiliary load while in the first mode; and
        store energy received in the local signal while in the second mode; and
    wherein the auxiliary load is powered with the local signal while in the second mode.

2. The mobile fuel cell system according to claim 1, wherein: the fuel cell generator comprises a plurality of fuel cell stacks.

3. The mobile fuel cell system according to claim 2, wherein:
    the stack output signal comprises a plurality of stack output signals generated by the plurality of fuel cell stacks; and
    each of the plurality of boost converter circuits receives a corresponding one of the plurality of stack output signals.

4. The mobile fuel cell system according to claim 3, wherein the switch circuit includes:
    a plurality of first switches directly connected to the plurality of boost converter circuits;
    a high-voltage bus directly connected to the plurality of first switches; and
    a plurality of second switches directly connected between the high-voltage bus and the plurality of charging handles.

5. The mobile fuel cell system according to claim 1, further comprising a controller connected to the fuel cell generator and operable to adjust a setpoint of the fuel cell generator by deferring recharging of the rechargeable energy storage circuit while charging at least one of the plurality of electric vehicles.

6. The mobile fuel cell system according to claim 1, wherein the electrical power in the stack output signal is completely transferred to the plurality of charging handles while in the first mode.

7. The mobile fuel cell system according to claim 1, further comprising a portable inverter connected to the switch circuit, wherein:
    the portable inverter is operable to generate a portable signal; and
    the switch circuit is operable to present the portable signal to one or more of the plurality of charging handles to charge one or more support batteries in one or more of the plurality of electric vehicles.

8. The mobile fuel cell system according to claim 1, wherein the switch circuit is configured to combine two or more of the plurality of recharge signals to charge one of the plurality of electric vehicles.

9. The mobile fuel cell system according to claim 1, wherein the switch circuit is operable to connect each one of the plurality of boost converter circuits with each one of the plurality of charging handles.

10. A method for charging a plurality of electric vehicles with a mobile fuel cell system, the method comprising:

generating electrical power in a stack output signal with at least one fuel cell stack in a fuel cell generator disposed on a mobile platform;
converting the stack output signal into a plurality of recharge signals while in a first mode, wherein the stack output signal has a different voltage than the plurality of recharge signals;
converting the stack output signal into a local signal while in a second mode;
presenting corresponding ones of the plurality of recharge signals to corresponding ones of a plurality of charging handles while corresponding ones of the plurality of electric vehicles are being charged;
removing the corresponding ones of the plurality of recharge signals from the corresponding ones of the plurality of charging handles while the corresponding ones of the plurality of electric vehicles are not being charged;
transferring the corresponding ones of the plurality of recharge signals from the corresponding ones of the plurality of charging handles to the corresponding ones of the plurality of electric vehicles being charged;
powering an auxiliary load from a rechargeable energy storage circuit while in the first mode;
storing energy received in the local signal in the rechargeable energy storage circuit while in the second mode; and
powering the auxiliary load with the local signal while in the second mode.

11. A mobile fuel cell system comprising:
a fuel cell stack disposed on a mobile platform, wherein the fuel cell stack is operable to generate electrical power in a stack output signal;
a first boost converter circuit connected to the fuel cell stack, wherein the first boost converter circuit is operable to:
  convert the stack output signal into a first recharge signal while in a first mode; and
  convert the stack output signal into a local signal while in a second mode, wherein the stack output signal has a different voltage than the first recharge signal;
a first charging handle connectable to a first electric vehicle, wherein the first changing handle is operable to transfer the first recharge signal to the first electric vehicle;
a switch circuit connected between the first boost converter circuit and the first charging handle, wherein the switch circuit is operable to:
  present the first recharge signal to the first charging handle while the first electric vehicle is being charged;
  remove the first recharge signal from the first charging handle while the first electric vehicle is not being charged; and
  present the local signal while in the second mode;
an auxiliary load connected to the fuel cell stack and the switch circuit;
a rechargeable energy storage circuit connected to the auxiliary load and the switch circuit, wherein the rechargeable energy storage circuit is operable to:
  power the auxiliary load while in the first mode; and
  store energy received in the local signal while in the second mode; and
wherein the auxiliary load is powered with the local signal while in the second mode.

12. The mobile fuel cell system according to claim 11, further comprising:
a second boost converter circuit connected between the fuel cell stack and the switch circuit, wherein:
  the second boost converter circuit is operable to convert the stack output signal into a second recharge signal while in the first mode; and
  the stack output signal has a different voltage than the second recharge signal;
a second charging handle connectable to a second electric vehicle, wherein the second charging handle is operable to transfer the second recharge signal to the second electric vehicle; and
the switch circuit is connected between the second boost converter circuit and the second charging handle, wherein the switch circuit is operable to:
  present the second recharge signal to the second charging handle while the second electric vehicle is being charged; and
  remove the second recharge signal from the second charging handle while the second electric vehicle is not being charged.

13. The mobile fuel cell system according to claim 12, further comprising:
a third boost converter circuit connected between the fuel cell stack and the switch circuit, wherein:
  the third boost converter circuit is operable to convert the stack output signal into a third recharge signal while in the first mode; and
  the stack output signal has a different voltage than the third recharge signal;
a third charging handle connectable to a third electric vehicle, wherein the third charging handle is operable to transfer the third recharge signal to the third electric vehicle; and
the switch circuit is connected between the third boost converter circuit and the third charging handle, wherein the switch circuit is operable to:
  present the third recharge signal to the second charging handle while the third electric vehicle is being charged; and
  remove the third recharge signal from the third charging handle while the third electric vehicle is not being charged.

14. The mobile fuel cell system according to claim 13, wherein the local signal is generated by one of the second boost converter circuit or the third boost converter circuit while in the first mode.

15. The mobile fuel cell system according to claim 12, wherein the fuel cell stack is operable in a voltage suppression mode; and
the second boost converter circuit is operable to continue charging the second electric vehicle during the voltage suppression mode.

16. The mobile fuel cell system according to claim 12, wherein the fuel cell stack is operable in a voltage recovery mode; and
the second boost converter circuit is operable to continue charging the second electric vehicle during the voltage recovery mode.

17. The mobile fuel cell system according to claim 12, wherein the local signal allows the fuel cell stack to continue to generate the stack output signal and the second boost converter circuit to charge the second electric vehicle while the rechargeable energy storage circuit is depleted.

18. The mobile fuel cell system according to claim 11, wherein the electrical power in the stack output signal is completely transferred to the first electric vehicle while in the first mode.

19. The mobile fuel cell system according to claim 11, wherein charging of the rechargeable energy storage circuit while in the second mode delays a shutdown of the fuel cell stack while the first charging handle is not being used.

20. The mobile fuel cell system according to claim 11, further comprising one or more auxiliary loads, wherein the auxiliary loads are powered by the rechargeable energy storage circuit while in the first mode and by the local signal while in the second mode.

* * * * *